(12) United States Patent
Auden et al.

(10) Patent No.: US 9,975,585 B2
(45) Date of Patent: May 22, 2018

(54) ACTIVE DIVE-PLANES FOR A MOTOR VEHICLE

(71) Applicant: GM GLOBAL TECHNOLOGY OPERATIONS LLC, Detroit, MI (US)

(72) Inventors: Joshua R. Auden, Brighton, MI (US); Jason D. Fahland, Fenton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 52 days.

(21) Appl. No.: 15/208,109

(22) Filed: Jul. 12, 2016

(65) Prior Publication Data
US 2018/0015968 A1 Jan. 18, 2018

(51) Int. Cl.
*B62D 37/02* (2006.01)
*B62D 35/00* (2006.01)
*G07C 5/08* (2006.01)

(52) U.S. Cl.
CPC ............. *B62D 35/008* (2013.01); *G07C 5/08* (2013.01)

(58) Field of Classification Search
CPC ................................ G07C 5/08; B62D 35/008
USPC ............................................ 296/180.1, 180.5
See application file for complete search history.

(56) References Cited

U.S. PATENT DOCUMENTS

| | | | | |
|---|---|---|---|---|
| 8,308,222 B2* | 11/2012 | Ondracek | .............. | B62D 37/02 296/180.1 |
| 9,849,924 B2* | 12/2017 | Shami | .................... | B62D 37/02 |
| 2015/0345578 A1* | 12/2015 | Nightingale | ......... | B60K 11/085 188/264 AA |
| 2015/0353149 A1* | 12/2015 | Wolf | .................... | B62D 35/007 296/180.5 |
| 2016/0244107 A1* | 8/2016 | Ishiba | .................. | B62D 35/008 |
| 2017/0240224 A1* | 8/2017 | Gaylard | .............. | B62D 35/005 |

\* cited by examiner

*Primary Examiner* — Pinel E Romain
(74) *Attorney, Agent, or Firm* — Quinn IP Law

(57) ABSTRACT

A dive-plane system for a vehicle includes first and second dive-planes. The vehicle includes a vehicle body having a first vehicle body end facing oncoming ambient airflow when the vehicle is in motion and first and second lateral body sides. The first dive-plane is mounted to the first lateral body side proximate the first body end to generate an aerodynamic downforce on the first body end at the first lateral body side. The second dive-plane is mounted to the second lateral body side proximate the first body end and configured to generate an aerodynamic downforce on the first body end at the second lateral body side. The dive-plane system also includes a mechanism configured to selectively and individually shift each of the first and second dive-planes relative to the vehicle body to adjust a magnitude of the aerodynamic downforce generated by each dive-plane on the first vehicle body end.

16 Claims, 2 Drawing Sheets

ACTIVE DIVE-PLANES FOR A MOTOR VEHICLE

TECHNICAL FIELD

The disclosure relates to active dive-planes for enhancement of aerodynamics of a motor vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may be used to achieve downforce in high-performance vehicles in order to improve vehicle traction and cornering abilities. The study is typically used to shape vehicle bodywork for achieving a desired compromise among the above characteristics for specific vehicle use.

A diving plane or dive-plane is an aerodynamic device sometimes used to increase the amount of downforce at the front of the road vehicle. Dive-planes are typically fitted on a vehicle just ahead of the front wheels. Such dive-planes are most commonly found on racing cars and are used to create additional downforce and channel airflow to help balance the vehicle for stability and cornering. Typically, the airstream is slowed at an upper surface of the dive-plane, causing an area of high pressure. Below the dive-plane, the airstream is redirected along the vehicle body and is accelerated, causing the pressure to drop. Thus reduced, the pressure below the dive-plane combined with the high pressure above the dive-plane, creates downforce at the front end of the vehicle body. Generally, the larger the area of the dive-plane, the more downforce is generated at the front of the vehicle.

SUMMARY

A dive-plane system for a vehicle includes a first dive-plane and a second dive-plane. The vehicle includes a vehicle body arranged along a longitudinal body axis and having a first vehicle body end facing oncoming ambient airflow. The vehicle body also has first and second lateral body sides. The first dive-plane is mounted to the first lateral body side proximate the first vehicle body end to generate an aerodynamic downforce on the first vehicle body end at the first lateral body side when the vehicle is in motion. The second dive-plane is mounted to the second lateral body side proximate the first vehicle body end and configured to generate an aerodynamic downforce on the first vehicle body end at the second lateral body side when the vehicle is in motion. The dive-plane system also includes a mechanism configured to selectively and individually shift each of the first and second dive-planes relative to the vehicle body to adjust a magnitude of the aerodynamic downforce generated by each dive-plane on the first vehicle body end.

The mechanism may be configured to selectively shift each of the first dive-plane and the second dive-plane in a direction transverse to the longitudinal body axis, i.e., selectively deploy and retract the first and second dive-planes.

Each of the first dive-plane and the second dive-plane can be arranged along a dive-plane axis arranged parallel to the road surface and transverse to the longitudinal body axis. Also, the mechanism can be configured to selectively and individually rotate each of the first dive-plane and the second dive-plane relative to the first vehicle body end about the dive-plane axis to thereby adjust the magnitude of the aerodynamic downforce generated by the respective first and second dive-planes on the first vehicle body end.

The dive-plane system may also include an electronic controller configured to regulate the mechanism.

The vehicle may also include a road wheel and the dive-plane system may further include a first sensor configured to detect a rotating speed of the road wheel and communicate the detected rotating speed of the road wheel to the controller.

The dive-plane system may also include a second sensor configured to detect a yaw rate of the vehicle body and communicate the detected yaw rate to the controller.

The dive-plane system may also include a third sensor configured to detect a velocity of ambient airflow relative to the vehicle and communicate the detected velocity of the ambient airflow to the controller.

The vehicle may additionally include a steering wheel and the dive-plane system may further include a fourth sensor configured to detect an angle of the steering wheel.

The controller may be configured to selectively shift, via the mechanism, at least one of the first and second dive-planes in a direction transverse to the longitudinal body axis during vehicle cornering in response to the detected yaw rate, the detected angle of the steering wheel, and at least one of the detected rotating speed of the road wheel and velocity of the ambient airflow, to thereby vary the aerodynamic downforce on the vehicle's first body end and control the detected yaw rate.

The controller may be additionally programmed to selectively shift, via the mechanism, at least one of the first and second dive-planes in a direction transverse to the longitudinal body axis according to a lookup table establishing a correspondence of magnitude of shift of each of the first dive-plane and the second dive-plane and a magnitude of the aerodynamic downforce generated by the dive-plane system on the vehicle's first body end.

The mechanism may include at least one of a linear actuator, a rotary actuator, and an electric motor.

A vehicle employing such a dive-plane system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
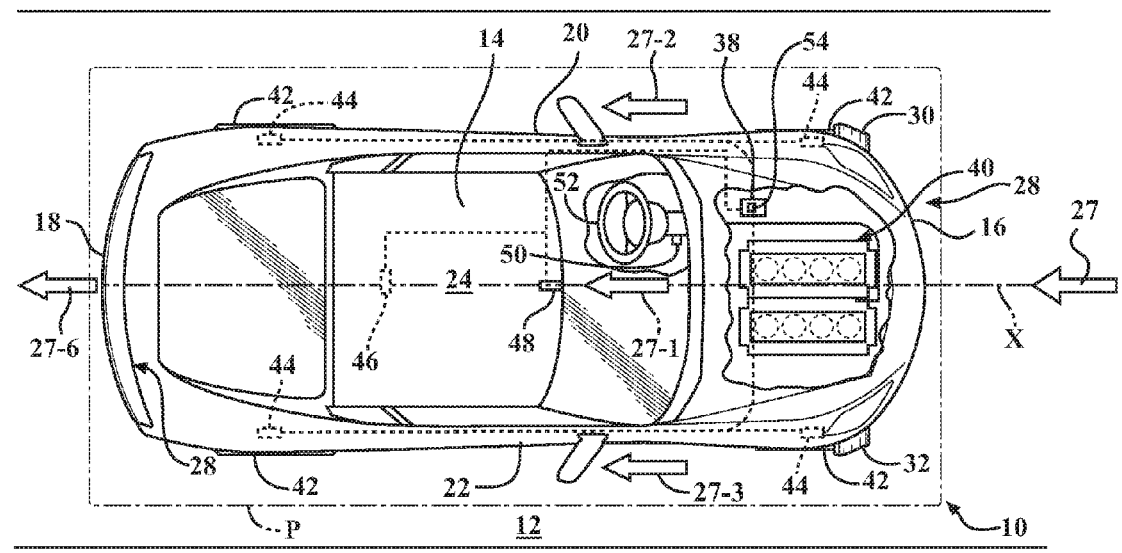
FIG. 1 is a schematic top view of a vehicle having a vehicle body arranged in a body plane along a longitudinal axis, and having a dive-plane system with movable dive-plains according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion (not shown), that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion that passes under the vehicle body 14, between the underbody portion and the road surface 12, but is not specifically shown. As understood by those skilled in the art, the recirculating airflow region 27-6 is generally caused at elevated vehicle speeds by the flow of surrounding air around the six body sides of the vehicle body 14.

Figure 2:
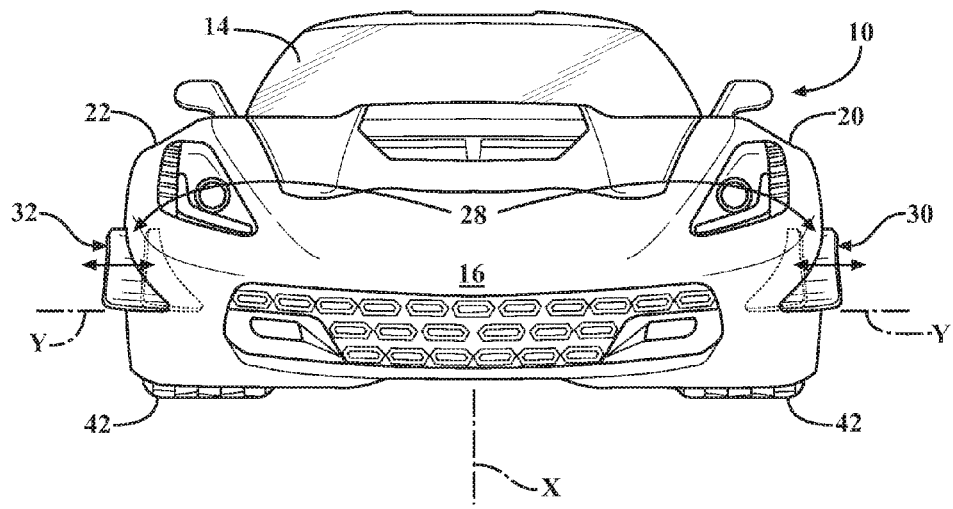
FIG. 2 is a schematic front view of the vehicle shown in FIG. 1 according to the disclosure.

As shown in FIGS. 1 and 2, the vehicle 10 also includes a dive-plane system 28. The dive-plane system 28 includes a first or left-side dive-plane 30 configured to be moveably mounted to the left side 20 of the vehicle body 14. As shown, the left-side dive-plane 30 is arranged proximate the front end 16 and configured to generate an aerodynamic downforce $F_{D1}$ on the front end at the left side 20 when the vehicle 10 is in motion. The dive-plane system 28 also includes a second or right-side dive-plane 32 configured to be moveably mounted to the right side 22 of the vehicle body 14. As shown, the right-side dive-plane 32 is similarly arranged proximate the front end 16 and configured to generate an aerodynamic downforce $F_{D2}$ on the front end at the right side 22 when the vehicle 10 is in motion. As shown, the left-side and right-side dive-planes 30, 32 are arranged along a dive-plane axis Y that is substantially transverse to the longitudinal body axis X of the vehicle body 14 and can also be substantially parallel to the road surface 12. Each of the dive-planes 30, 32 can be shaped as a curved ramp and/or include at least some portion thereof shaped as an airfoil. Furthermore, each of the dive-planes 30, 32 can be constructed from a rigid fracture-resistant material, such as steel, aluminum, carbon fiber, or specially formulated plastic.

The dive-plane system 28 additionally includes a mechanism 34 configured to selectively and individually shift each of the left-side dive-plane 30 and the right-side dive-plane 32 relative to the vehicle body 14. By individually shifting the left-side and the right-side dive-planes 30, 32, the mechanism 34 separately adjusts a magnitude of the respective aerodynamic downforce $F_{D1}$ and downforce $F_{D2}$ generated on the front end 16. Specifically, the mechanism 34 may be configured to selectively shift each of the left-side dive-plane 30 and the right-side dive-plane 32 in a direction along the dive-plane axis Y. Such shifting of the left-side and right-side dive-planes 30, 32 transverse to the longitudinal body axis X can be employed to selectively deploy each dive-plane into the respective second airflow portion 27-2 and the third airflow portion 27-3, and retract the dive-planes therefrom and into the respective left and right sides 20, 22. Also, such shifting of the left-side dive-plane 30 and the right-side dive-plane 32 transverse to the longitudinal body axis X can be employed to selectively increase and decrease the exposed areas of the dive-planes, to thereby increase and decrease the magnitude of the respective aerodynamic downforce $F_{D1}$ and $F_{D2}$ on the front end 16. Each of the left-side dive-plane 30 and the right-side dive-plane 32 can be configured to retract into dedicated recesses (not shown) defined by the respective left and right sides 20, 22. As such, the respective the left-side and right-side dive-planes 30, 32 may be configured to slide within the respective recesses 20A, 22A.

The mechanism 34 can be additionally configured to selectively and individually rotate each of the left-side dive-plane 30 and the right-side dive-plane 32 relative to the first vehicle body end 16 and about the dive-plane axis Y. Such rotation of the left-side and right-side dive-planes 30, 32 is intended to change the dive-planes' position relative to the respective left and right body sides 20, 22. As a result, the rotation of the left-side dive-plane 30 and the right-side dive-plane 32 can adjust the magnitude of the respective aerodynamic downforce $F_{D1}$ and downforce $F_{D2}$ generated on the front end 16.

Figure 3:
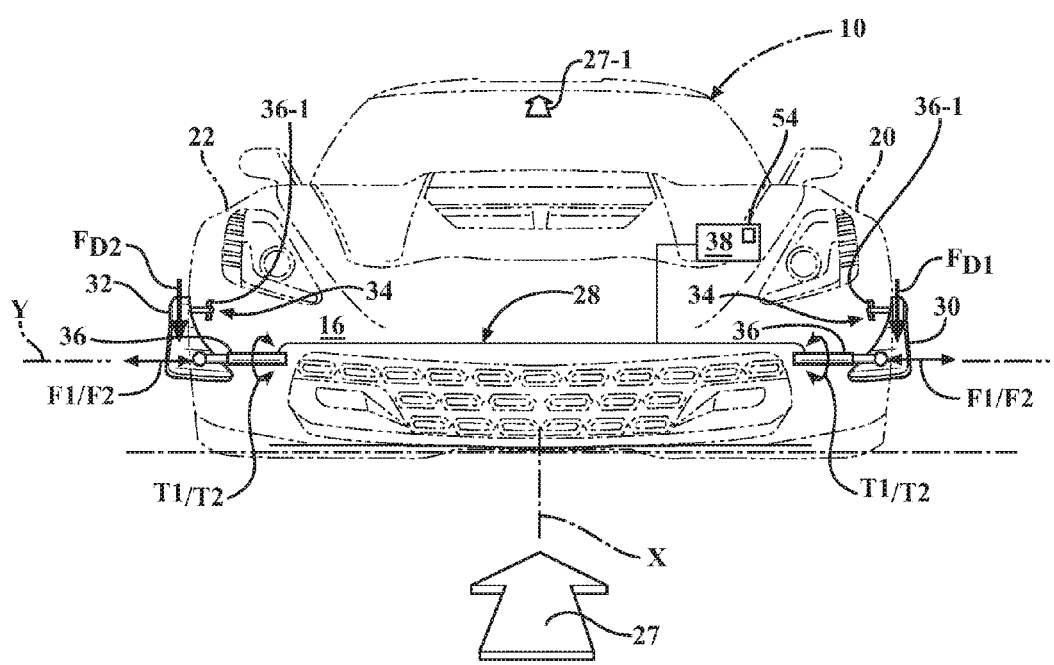
FIG. 3 is a schematic phantom view of the vehicle shown in FIGS. 1-2 along with a detailed view of the dive-plane system according to the disclosure.

The mechanism 34 can include a set of individual devices 36 for shifting the left-side and right-side dive-planes 30, 32 toward and away from the respective first and second lateral body sides 20, 22, as well as rotating the respective dive-planes relative to the vehicle body 14. Such a set of individual devices 36 can have one device 36 specifically for driving the left-side dive-plane 30 and another device 36 specifically for driving the right-side dive-plane 32. Each device 36 may be positioned between the vehicle body 14 and the respective left-side and right-side dive-planes 30, 32 for generating movement of the respective dive-planes, such as a linear actuator, a rotary actuator, and/or an electric motor (not shown in detail, but understood by those skilled in the art). As shown in FIG. 3, each device 36 may be configured to apply a force F1 to shift the respective left-side and right-side dive-planes 30, 32 in one direction and an opposite force F2 to shift the subject dive-planes in the opposite direction. Additionally, each device 36 may be configured to apply a torque T1 to rotate the respective left-side and right-side dive-planes 30, 32 in one direction and an opposite torque T2 to shift the subject dive-planes in the opposite direction. Each of the left-side and right-side dive-planes 30, 32 may include an auxiliary connection 36-1 to the vehicle body 14 to guide the respective dive-planes during rotation through their articulation ranges in a stable and reliable manner.

As shown in FIGS. 1-3, the vehicle also includes an electronic controller 38 configured, i.e., constructed and programmed, to regulate the mechanism 34. The controller 38 may be configured as a central processing unit (CPU) configured to regulate operation of an internal combustion engine 40 (shown in FIG. 1), a hybrid-electric powertrain (not shown), or other alternative types of powerplants, as well as other vehicle systems, or a dedicated controller. In order to appropriately control operation of the mechanism 34, the controller 38 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 38 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 38 may also include a floppy disk, a flexible disk, hard disk, magnetic tape, any other magnetic medium, a CD-ROM, DVD, any other optical medium, etc. The controller 38 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 38 or accessible thereby may be stored in the memory and automatically executed to provide the required functionality.

The dive-plane system may additionally include various sensors arranged on the vehicle 10 and in communication with the controller 38. As shown in FIG. 1, the vehicle 10 also includes road wheels 42. A plurality of first sensors 44 may be arranged on the vehicle body 14 for detecting rotating speeds of each road wheel 42. Each first sensor 44 may also be configured to communicate the detected rotating speed of the respective road wheel 42 to the controller 38, while the controller may be configured to correlate the data received from the respective first sensors to road speed of the vehicle 10. The vehicle 10 may also include a second sensor 46 configured to detect a yaw moment or rate on the vehicle body 14 relative to the road surface 12 and communicate the detected yaw rate to the controller 38. The vehicle may additionally include a third sensor 48 configured to detect a velocity of ambient airflow 27 relative to the vehicle 10 and communicate the detected velocity of the ambient airflow to the controller 38. The third sensor 48 may be a pitot tube configured to detect a pressure of the ambient airflow 27 at a specific location relative to the vehicle body 14, and the controller 38 can correlate the measured pressure to airflow velocity.

The controller 38 is additionally configured to selectively shift, via the mechanism 34, each of the left-side and right-side dive-planes 30, 32 toward and away from the respective first and second lateral body sides 20, 22 along the dive-plane axis Y and/or rotate the subject dive-planes during cornering of the vehicle 10 in response to the yaw rate detected by the second sensor 46. For example, if the vehicle 10 is negotiating a high-g turn, the left-side and right-side dive-planes 30, 32 can be extended away from the respective body sides 20, 22 to increase the downforce $F_{D1}$ and downforce $F_{D2}$ acting on the front end 16 and enhance the ability of the vehicle to maintain the selected line through the turn. Accordingly, the position of the left-side and right-side dive-planes 30, 32 can be regulated via the controller 38 relative to the respective body sides 20, 22 proportionately to the yaw rate generated during cornering of the vehicle 10 by shifting the subject dive-planes.

Furthermore, the controller 38 may be configured to selectively shift, via the mechanism 34, each of the left-side and right-side dive-planes 30, 32 toward and away from the respective first and second lateral body sides 20, 22 along the dive-plane axis Y and/or rotate the subject dive-planes in response to the rotating speeds of the road wheels 42 detected via the first sensor 44 and/or the velocity of the ambient airflow 27 detected via the third sensor 48. For example, if the vehicle 10 is traveling at an elevated road speed, the left-side and right-side dive-planes 30, 32 can be extended away from the respective body sides 20, 22 to increase the respective downforce $F_{D1}$ and downforce $F_{D2}$ acting on the front end 16 and enhance the stability and steering response of the vehicle at such conditions. On the other hand, the left-side and right-side dive-planes 30, 32 can be retracted toward the body sides 20, 22 to decrease the respective downforce $F_{D1}$ and downforce $F_{D2}$, and, as a result, decrease aerodynamic drag of the vehicle 10.

The controller 38 may also be programmed to determine a slip of the vehicle 10 relative to the road surface 12. The slip of the vehicle 10 may include a measure of how much each of the road wheels 42 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 50 operatively connected to a steering wheel 52 (shown in FIG. 1) and communicated to the controller 38. Furthermore, the controller 38 may be programmed to compare the determined steering wheel angle and yaw rate to determine how much the vehicle has deviated from its intended direction or path.

The controller 38 may also be programmed to control the slip of the vehicle 10 relative to the road surface 12 by controlling position of the left-side and right-side dive-planes 30, 32 relative to the respective body sides 20, 22 via the mechanism 34 in response to how much the vehicle has deviated from its intended path. The employed change in the position of the left-side and right-side dive-planes 30, 32 then urges the vehicle 10 to return the actual vehicle heading to the desired heading being commanded by an operator of the vehicle at the steering wheel 52. Additionally, two third sensors 48 may be arranged on the vehicle body 14 proximate the front end 16, one such third sensor on the left side 20 and another third sensor on the right side 22 (not shown). The controller 38 may then be configured to selectively and individually vary the position of the left-side and right-side dive-planes 30, 32 relative to the respective body sides 20, 22 in response to a determined differential between air velocity measurements at each third sensor 48 as the vehicle 10 enters and negotiates a turn to vary the respective downforce $F_{D1}$ and downforce $F_{D2}$ on the vehicle body 14.

The controller 38 may be additionally programmed with a lookup table 54 establishing correspondence between the previously described vehicle parameters—the vehicle slip, yaw rate, vehicle road speed, and/or velocity of the airflow and appropriate position of the left-side and right-side dive-planes 30, 32 for affecting appropriate regulation of the mechanism 34. Specifically, the lookup table 54 can establish a correspondence of magnitude of shift for each of the left-side dive-plane 30 and the right-side dive-plane 32 and a magnitude of the aerodynamic downforce $F_{D1}$ and downforce $F_{D2}$ generated by the dive-plane system 28 on the front end 16. The lookup table 54 may be developed empirically during validation and testing of the vehicle 10. As the position of the left-side and right-side dive-planes 30, 32 is varied relative to the respective body sides 20, 22 during the cornering event or at elevated road speeds, the dive-plane system 28 can adjust the respective downforce $F_{D1}$ and downforce $F_{D2}$ at the front end of the vehicle body 14 to affect the dynamic behavior of the vehicle 10.

Accordingly, control of the position of the left-side and right-side dive-planes 30, 32 may be employed to maintain contact of the vehicle 10 with the road surface 12 at elevated speeds by countering aerodynamic lift of the vehicle body 14 in response to the velocity of the second airflow portion 27-2 and the third airflow portion 27-3 detected by the individual third sensors 48. Additionally, control of the position of the left-side and right-side dive-planes 30, 32 may be employed to aid handling of the vehicle 10 in order to maintain the vehicle on its intended path by countering and controlling the yaw moment acting on the vehicle body 14 as detected by the second sensor 46.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A dive-plane system for a vehicle having a road wheel and a vehicle body arranged along a longitudinal body axis and including a first vehicle body end configured to face oncoming ambient airflow when the vehicle is in motion relative to a road surface, a second body end opposing the first body end, and first and second lateral body sides spanning a distance between the first and second body ends, the dive-plane system comprising:
   a first dive-plane configured to be mounted to the first lateral body side proximate the first vehicle body end and configured to generate an aerodynamic downforce on the first vehicle body end at the first lateral body side when the vehicle is in motion;
   a second dive-plane configured to be mounted to the second lateral body side proximate the first vehicle body end and configured to generate an aerodynamic downforce on the first vehicle body end at the second lateral body side when the vehicle is in motion;
   a mechanism configured to selectively and individually shift each of the first dive-plane and the second dive-plane relative to the vehicle body to thereby adjust a magnitude of the aerodynamic downforce generated by each of the first and second dive-planes on the first vehicle body end;
   an electronic controller configured to regulate the mechanism; and
   a first sensor configured to detect a rotating speed of the road wheel and communicate the detected rotating speed of the road wheel to the controller.

2. The dive-plane system according to claim 1, wherein the mechanism is configured to selectively shift each of the first dive-plane and the second dive-plane in a direction transverse to the longitudinal body axis.

3. The dive-plane system according to claim 1, wherein:
   each of the first dive-plane and the second dive-plane is arranged along a dive-plane axis arranged parallel to the road surface and transverse to the longitudinal body axis; and
   the mechanism is configured to selectively and individually rotate each of the first dive-plane and the second dive-plane relative to the first vehicle body end about the dive-plane axis to thereby adjust the magnitude of the aerodynamic downforce generated by the respective first and second dive-planes on the first vehicle body end.

4. The dive-plane system according to claim 1, further comprising a second sensor configured to detect a yaw rate of the vehicle body and communicate the detected yaw rate to the controller.

5. The dive-plane system according to claim 4, further comprising a third sensor configured to detect a velocity of ambient airflow relative to the vehicle and communicate the detected velocity of the ambient airflow to the controller.

6. The dive-plane system according to claim 5, wherein the vehicle includes a steering wheel, the dive-plane system further comprising a fourth sensor configured to detect an angle of the steering wheel.

7. The dive-plane system according to claim 6, wherein the controller is configured to selectively shift, via the mechanism, at least one of the first and second dive-planes during vehicle cornering in response to the detected yaw rate, the detected angle of the steering wheel, and at least one of the detected rotating speed of the road wheel and a velocity of the ambient airflow, to thereby vary the aerodynamic downforce on the first vehicle body end and control the detected yaw rate.

8. The dive-plane system according to claim 7, wherein the controller is programmed to selectively shift, via the mechanism, at least one of the first and second dive-planes according to a lookup table establishing a correspondence of a magnitude of shift of each of the first dive-plane and the second dive-plane and a magnitude of the aerodynamic downforce generated by the dive-plane system on the first vehicle body end.

9. A vehicle comprising:
   a road wheel;
   a vehicle body arranged along a longitudinal body axis and including a first vehicle body end configured to face oncoming ambient airflow when the vehicle is in motion relative to a road surface, a second body end opposing the first body end, and first and second lateral body sides spanning a distance between the first and second body ends; and
   a dive-plane system having:
      a first dive-plane mounted to the first lateral body side proximate the first vehicle body end and configured to generate an aerodynamic downforce on the first vehicle body end at the first lateral body side when the vehicle is in motion;
      a second dive-plane mounted to the second lateral body side proximate the first vehicle body end and configured to generate an aerodynamic downforce on the first vehicle body end at the second lateral body side when the vehicle is in motion; and
      a mechanism configured to selectively and individually shift each of the first dive-plane and the second dive-plane relative to the vehicle body to thereby adjust a magnitude of the aerodynamic downforce generated by each of the first and second dive-planes on the first vehicle body end;
an electronic controller configured to regulate the mechanism; and
a first sensor configured to detect a rotating speed of the road wheel and communicate the detected rotating speed of the road wheel to the controller.

10. The vehicle according to claim 9, wherein the mechanism is configured to selectively shift each of the first dive-plane and the second dive-plane in a direction transverse to the longitudinal body axis.

11. The vehicle according to claim 9, wherein:
each of the first dive-plane and the second dive-plane is arranged along a dive-plane axis arranged parallel to the road surface and transverse to the longitudinal body axis; and
the mechanism is configured to selectively and individually rotate each of the first dive-plane and the second dive-plane relative to the first vehicle body end about the dive-plane axis to thereby adjust the magnitude of the aerodynamic downforce generated by the respective first and second dive-planes on the first vehicle body end.

12. The vehicle according to claim 9, further comprising a second sensor configured to detect a yaw rate of the vehicle body and communicate the detected yaw rate to the controller.

13. The vehicle according to claim 12, further comprising a third sensor configured to detect a velocity of ambient airflow relative to the vehicle and communicate the detected velocity of the ambient airflow to the controller.

14. The vehicle according to claim 13, further comprising a steering wheel and a fourth sensor configured to detect an angle of the steering wheel.

15. The vehicle according to claim 14, wherein the controller is configured to selectively shift, via the mechanism, at least one of the first and second dive-planes during vehicle cornering in response to the detected yaw rate, the detected angle of the steering wheel, and at least one of the detected rotating speed of the road wheel and a velocity of the ambient airflow, to thereby vary the aerodynamic downforce on the first vehicle body end and control the detected yaw rate.

16. The vehicle according to claim 15, wherein the controller is programmed to selectively shift, via the mechanism, at least one of the first and second dive-planes according to a lookup table establishing a correspondence of a magnitude of shift of each of the first dive-plane and the second dive-plane and a magnitude of the aerodynamic downforce generated by the dive-plane system on the first vehicle body end.

* * * * *